(12) United States Patent
Tanaka et al.

(10) Patent No.: US 9,825,385 B1
(45) Date of Patent: Nov. 21, 2017

(54) CARD HOLDING DEVICE

(71) Applicant: KABUSHIKI KAISHA TOSHIBA, Minato-ku (JP)

(72) Inventors: Akira Tanaka, Hamura (JP); Masaya Hirashima, Ome (JP); Shukuyo Yamada, Ome (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/420,887

(22) Filed: Jan. 31, 2017

(30) Foreign Application Priority Data

Nov. 2, 2016 (JP) .................................. 2016-214799

(51) Int. Cl.
*H01R 12/00* (2006.01)
*H01R 12/72* (2011.01)
*H01R 33/965* (2006.01)

(52) U.S. Cl.
CPC ......... *H01R 12/727* (2013.01); *H01R 33/965* (2013.01)

(58) Field of Classification Search
CPC .................................................. H01R 12/727
USPC .................................................. 439/331, 68
See application file for complete search history.

(56) References Cited

U.S. PATENT DOCUMENTS

| | | | | |
|---|---|---|---|---|
| 5,986,891 A * | 11/1999 | Sugimoto | ............ | H05K 5/0269 361/736 |
| 7,112,082 B2 * | 9/2006 | Tsai | ............ | H04B 1/3816 439/329 |
| 7,494,381 B1 * | 2/2009 | Wu | ............ | H01R 12/714 439/630 |
| 8,915,746 B2 | 12/2014 | Samuels et al. | | |
| 9,142,897 B2 * | 9/2015 | Shimada | ............ | H01R 12/7005 |
| 9,590,331 B2 * | 3/2017 | Tanaka | ............ | G06K 7/04 |
| 2006/0040561 A1 * | 2/2006 | Chang | ............ | G06K 7/0013 439/630 |
| 2008/0299794 A1 * | 12/2008 | Lin | ............ | H01R 13/65802 439/68 |
| 2016/0118733 A1 | 4/2016 | Tanaka et al. | | |

FOREIGN PATENT DOCUMENTS

| | | | |
|---|---|---|---|
| JP | 2007234357 A | * | 9/2007 |
| JP | 2013-239391 | | 11/2013 |
| JP | 2014-116917 | | 6/2014 |
| JP | 2015-20370 | | 2/2015 |
| JP | 2015-76130 | | 4/2015 |
| JP | 2015-207370 | | 11/2015 |

* cited by examiner

*Primary Examiner* — Abdullah Riyami
*Assistant Examiner* — Nader Alhawamdeh
(74) *Attorney, Agent, or Firm* — Oblon, McClelland, Maier & Neustadt, L.L.P.

(57) ABSTRACT

According to one embodiment, a holder includes a recessed portion and including an opening, and includes a contact exposed from part of a bottom surface of the recessed portion. A lid covers the holder from the recessed portion side, makes a space in the recessed portion airtight in an engaged state in which the opening of the recessed portion is closed, and includes an elastic member pushing down a contained object contained in the recessed portion. And a lock mechanism forms the engaged state between the lid and the holder.

20 Claims, 18 Drawing Sheets

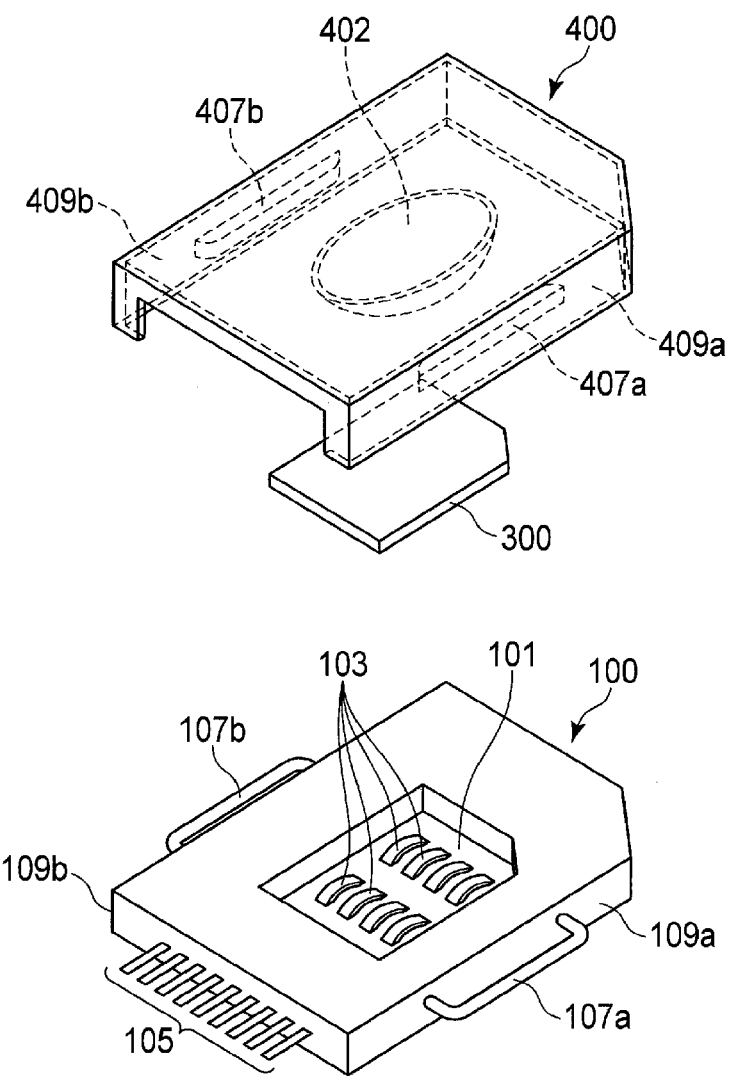
F I G. 1

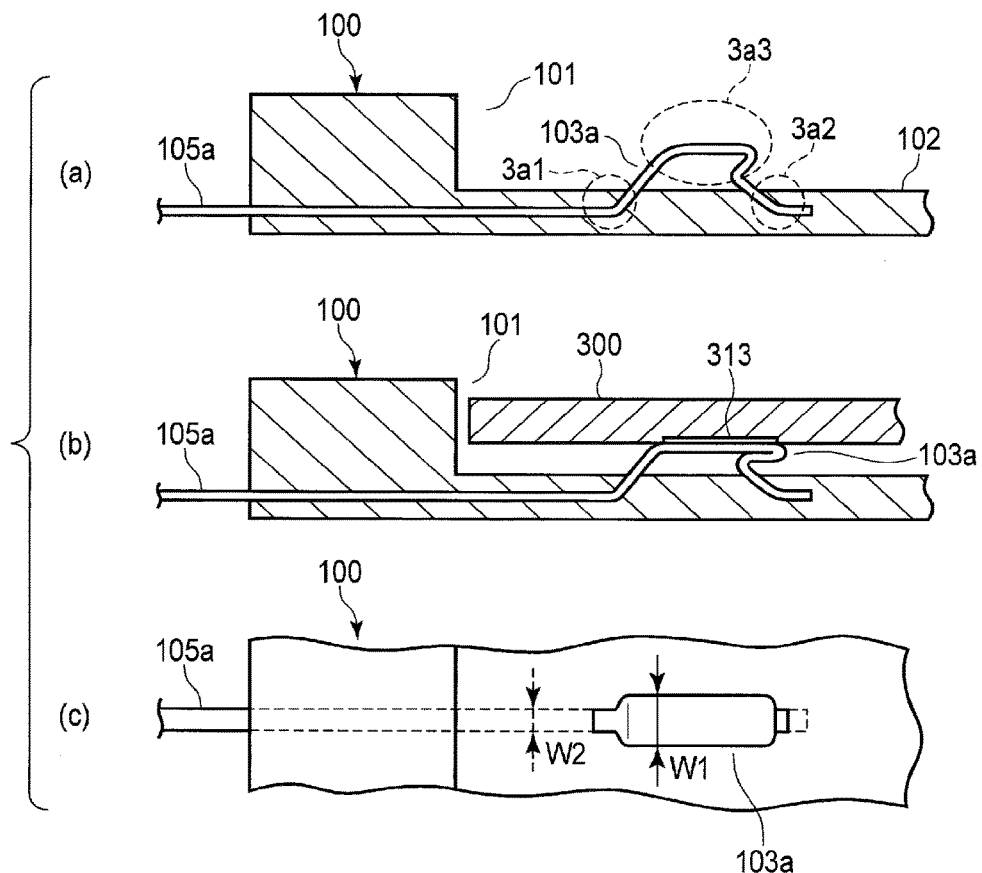
F I G. 2
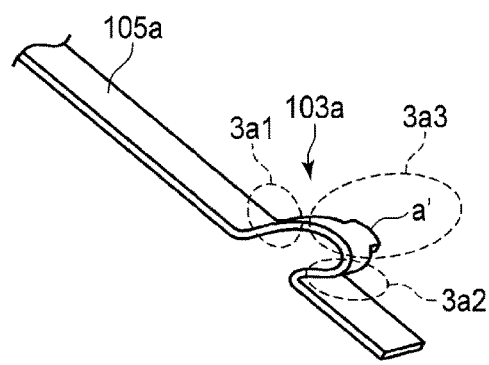
F I G. 3

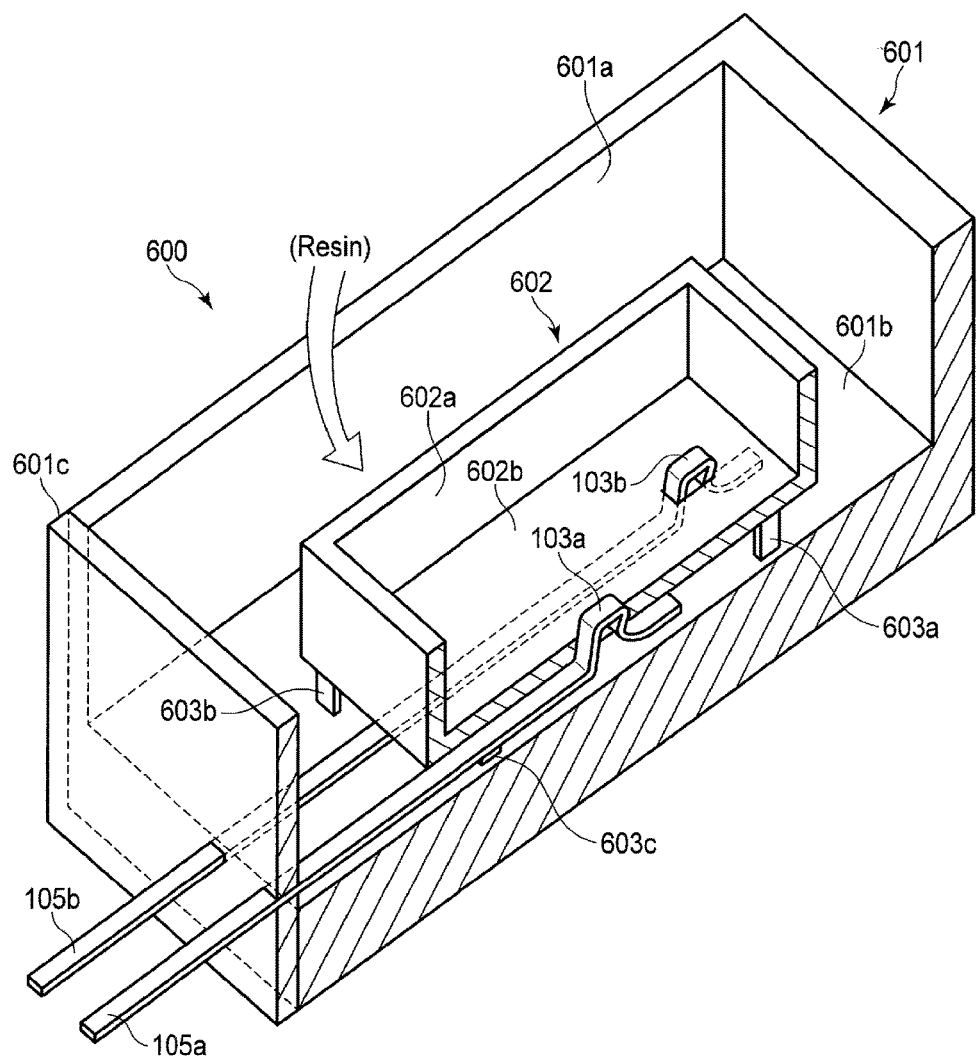
F I G. 4

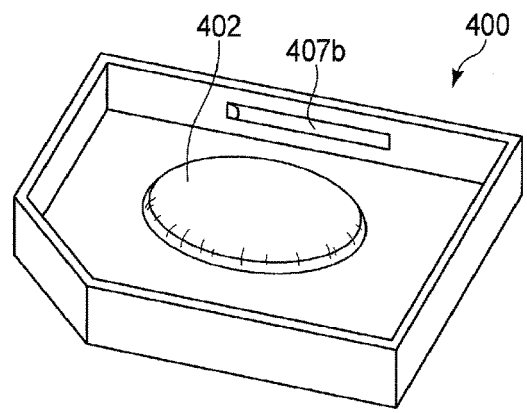
F I G. 6
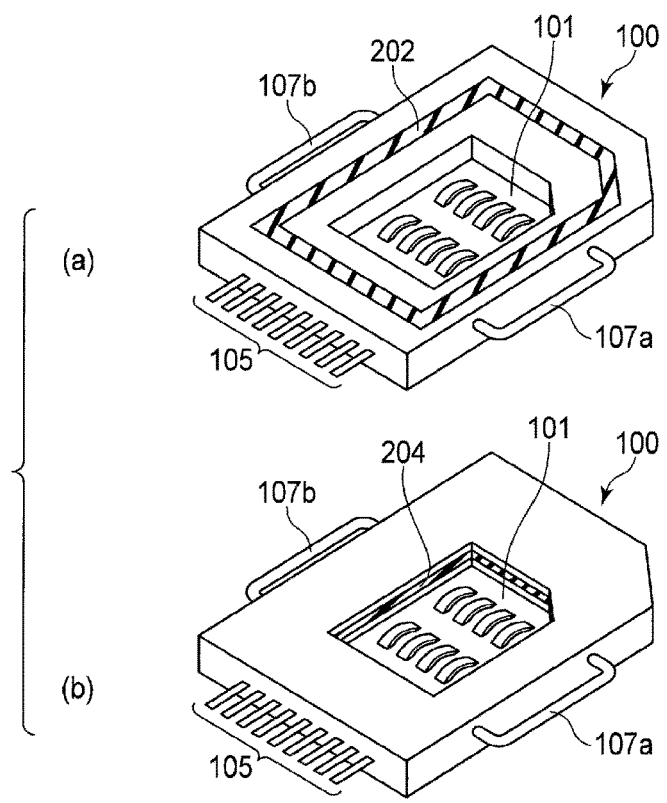
F I G. 7

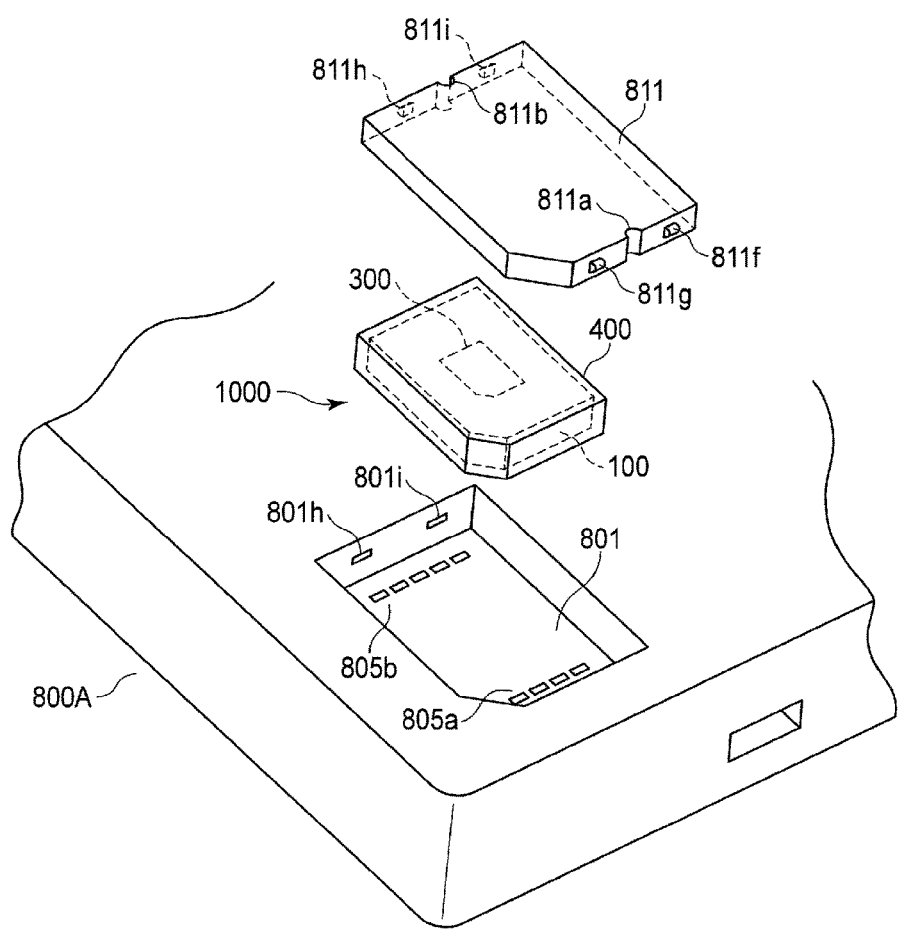
F I G. 11A

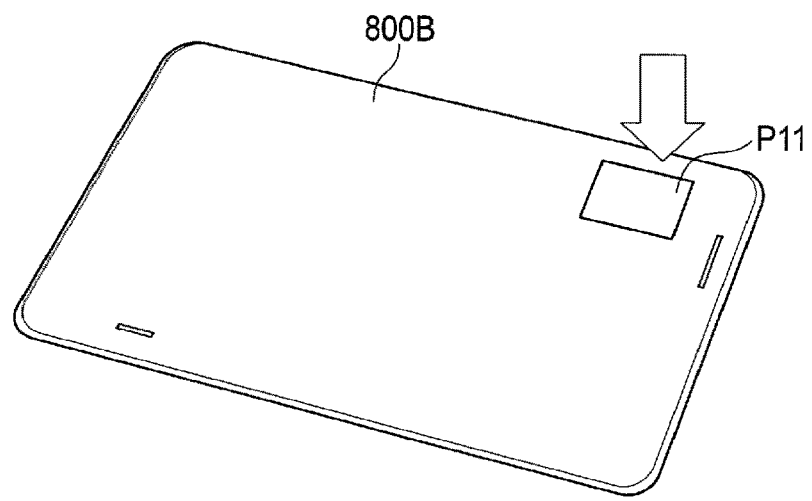
F I G. 11B
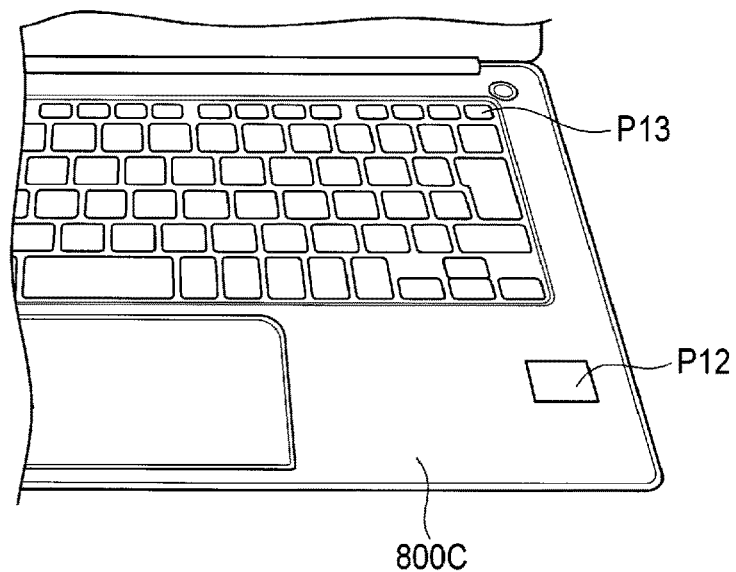
F I G. 11C

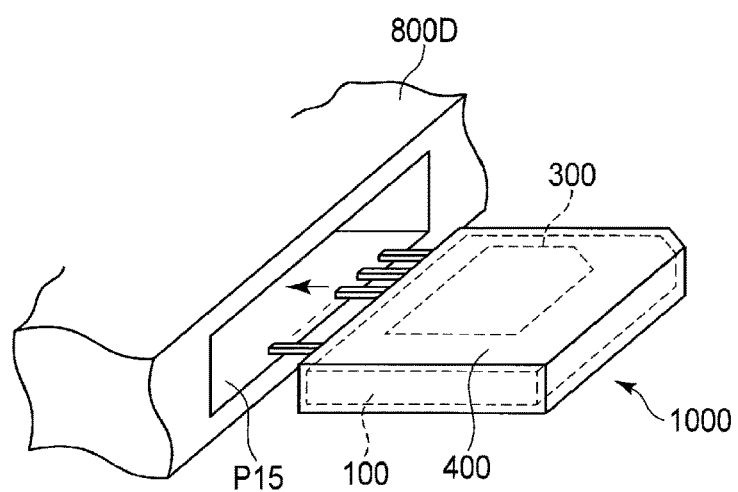
F I G. 11D

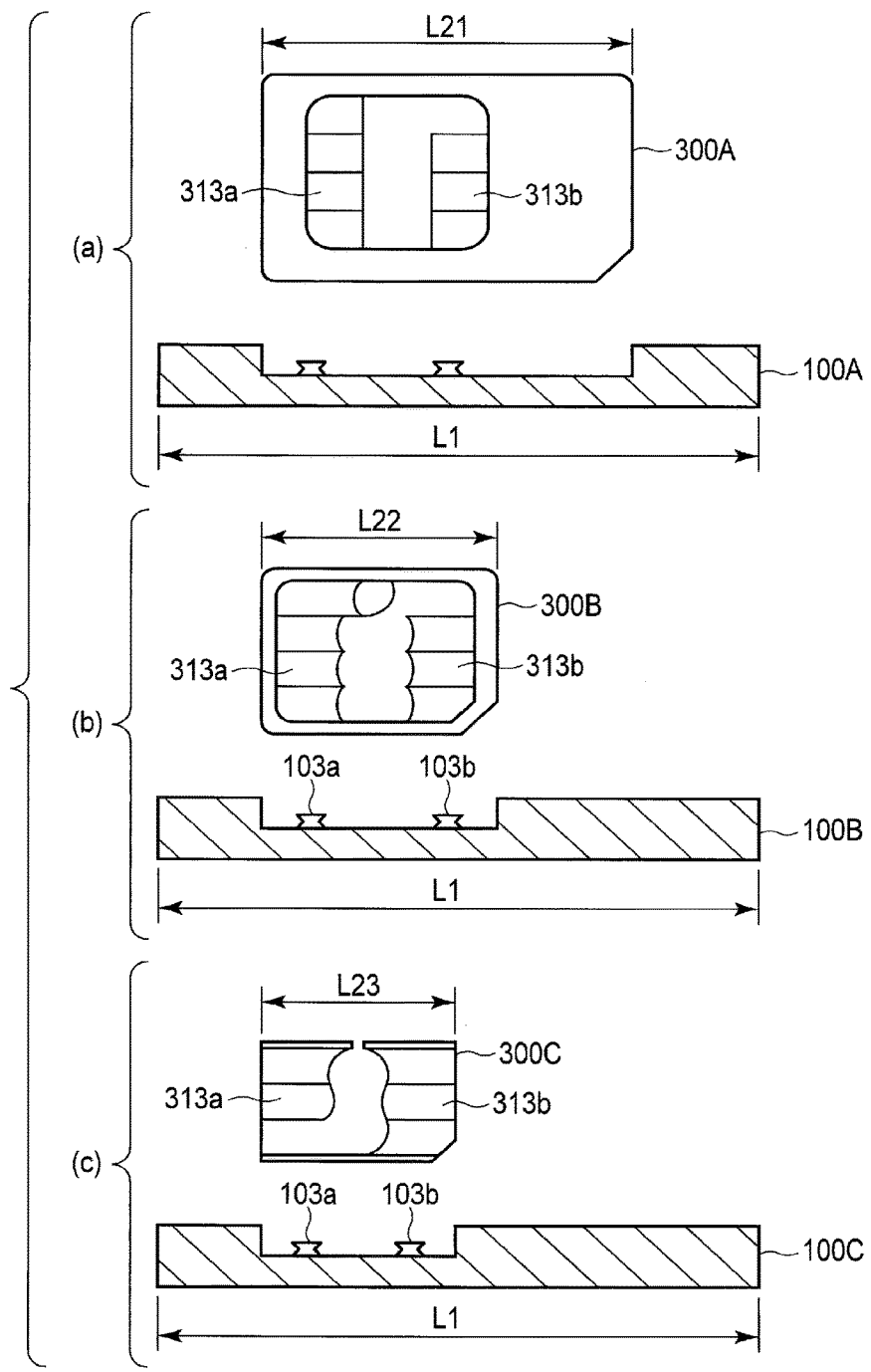
F I G. 12

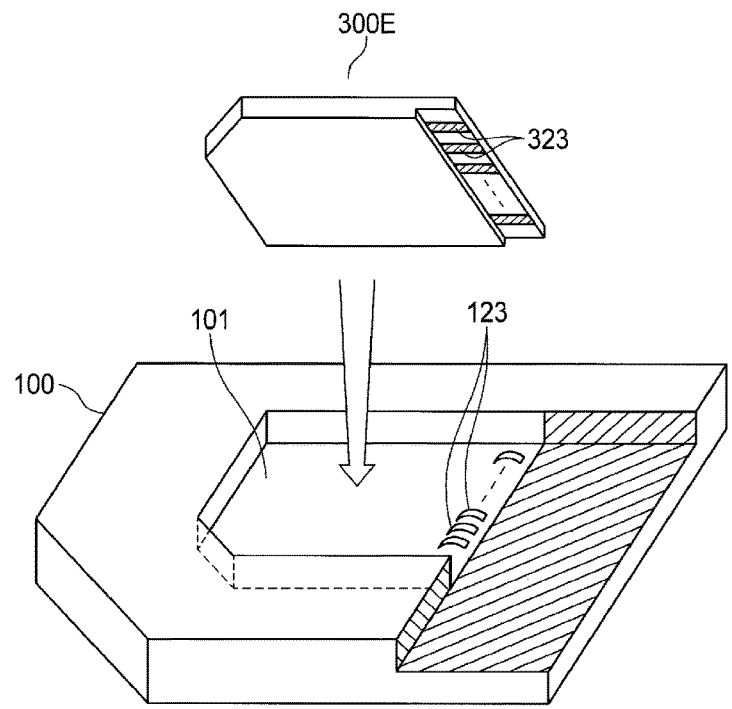
F I G. 13
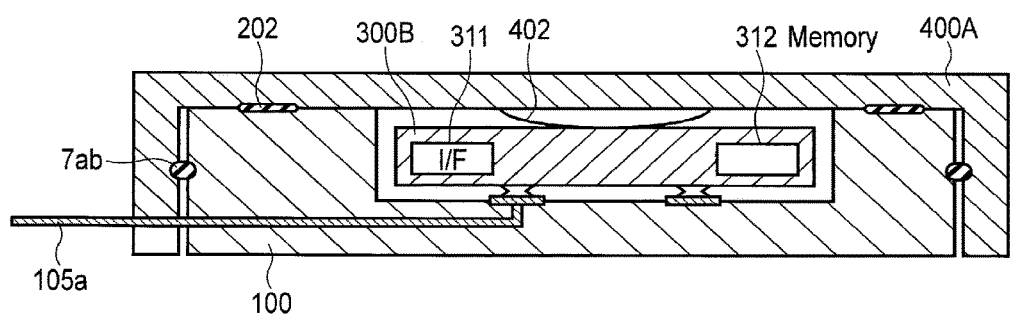
F I G. 14A

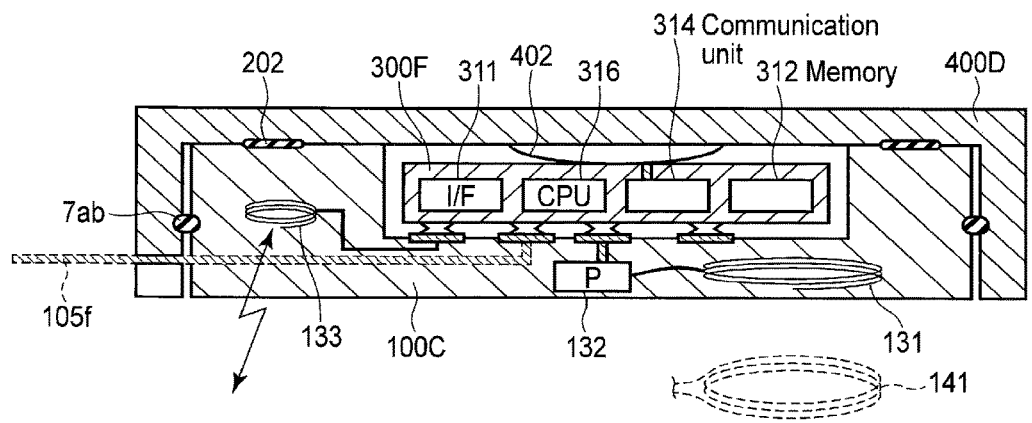
F I G. 14E
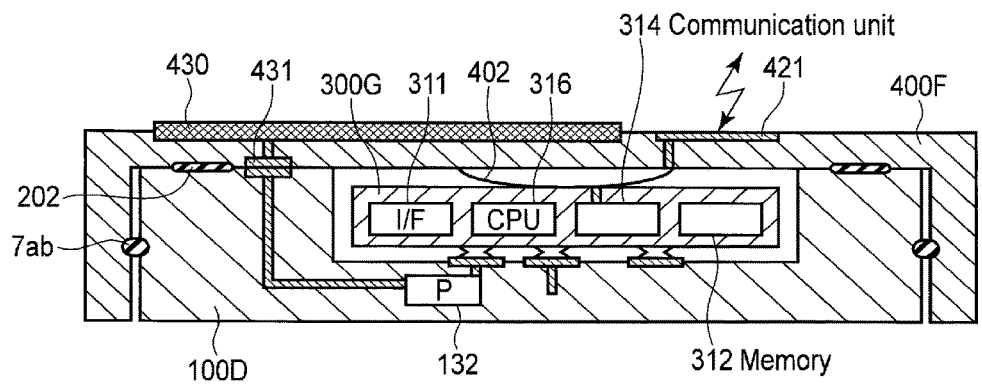
F I G. 14F

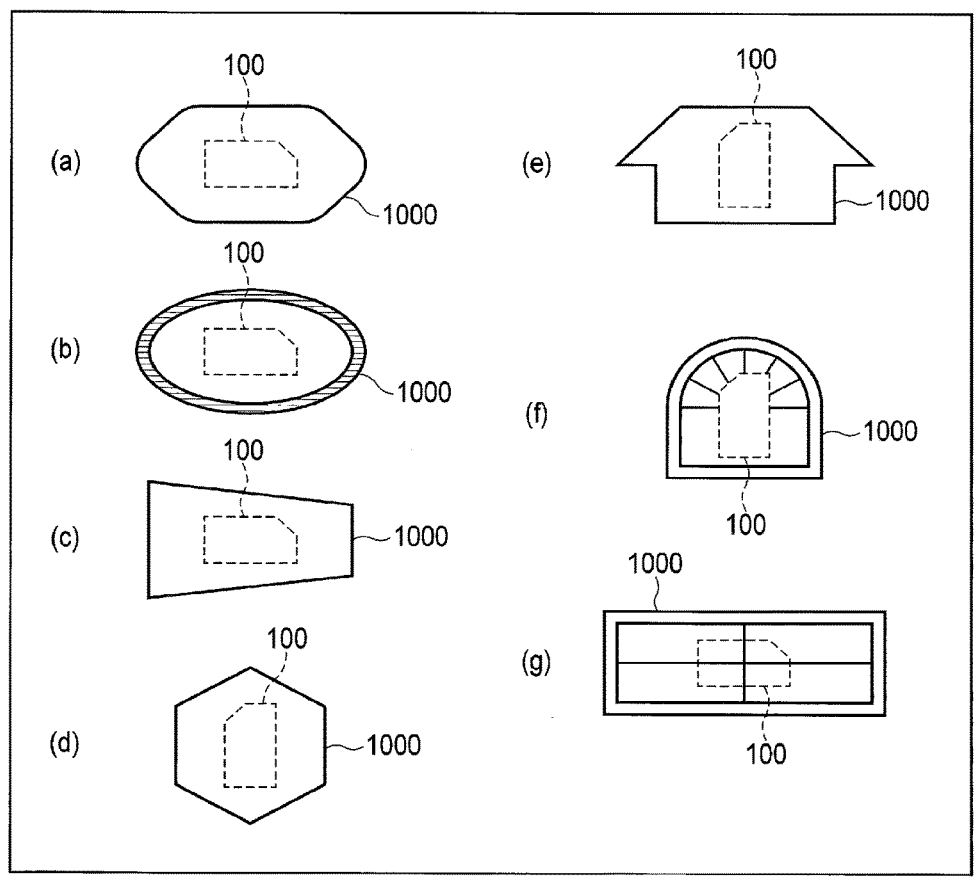
F I G. 15

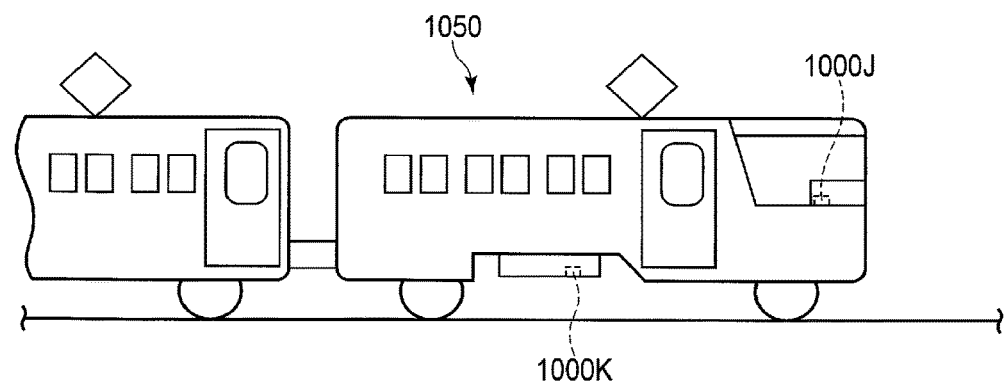
F I G. 17 ers are easily damaged. In addition, movable wing-like terminals are used in conventional connectors, the connectors lack air-tightness in the movable portions of the terminals, and have large risk of malfunction, because dust may easily enter therein.

CARD HOLDING DEVICE

CROSS-REFERENCE TO RELATED APPLICATIONS

This application is based upon and claims the benefit of priority from Japanese Patent Application No. 2016-214799, filed Nov. 2, 2016, the entire contents of which are incorporated herein by reference.

FIELD

Embodiments described herein relate generally to a card holding device.

BACKGROUND

In recent years, memory cards have been frequently adopted as storage media for electronic apparatuses such as electronic cameras, smartphones, and personal computers. A memory card has a structure in which an integrated circuit including a memory is embedded in an exterior package (housing) formed of resin or the like. For example, SIM (registered trademark) cards and SD (registered trademark) cards are well known as memory cards.

When a memory card is connected with an electronic apparatus, the memory card is connected via a connector. The connector includes a mechanical and movable terminal having elasticity and corresponding to a contact (a fixed contact portion) included in the memory card. With reduction in size of memory cards, the connectors including terminals have been miniaturized and have more complicated structures.

When the connectors are miniaturized, their movable terminals also require minute work and design. Consequently, mechanical strength thereof is reduced.

As described above, with reduction in size, conventional connectors have minutely worked mechanical portions, and are easily damaged. In addition, movable wing-like terminals are used in conventional connectors, the connectors lack air-tightness in the movable portions of the terminals, and have large risk of malfunction, because dust may easily enter therein.

By contrast, miniaturized memory cards is difficult to handle. For example, when the user inserts a small memory card into a connector, when the user forcibly pushes the memory card into the connector, the memory card and/or the connector are damaged. In addition, the user's finger may touch the terminal of the small memory card, and may cause contact failure. When the user attaches the small memory card into an electronic apparatus, the user may drop the small memory card, because of the small size thereof.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a partial exploded perspective view of an embodiment of a card holding device;

FIG. 2 is a partial cross-sectional view illustrated for explaining an attachment state of a contact to a holder in an embodiment;

FIG. 3 is a perspective view illustrating another example of the contact used for an embodiment;

FIG. 4 is a partial perspective view of an example of a molding apparatus for molding and manufacturing the holder used for an embodiment;

FIG. 6 is a perspective view illustrating the lid used for an embodiment from the rear side;

FIG. 7 is a perspective view illustrating a modification of the holder in an embodiment;

FIG. 11A is a diagram illustrating an example of an embodiment in which the card holding device and the card connecting device are mounted on an electronic apparatus;

FIG. 11B is a diagram illustrating another example of the embodiment in which the card holding device and the card connecting device are mounted on an electronic apparatus;

FIG. 11C is a diagram illustrating another example of the embodiment in which the card holding device and the card connecting device are mounted on an electronic apparatus;

FIG. 11D is a diagram illustrating another example of the embodiment in which the card holding device and the card connecting device are mounted on an electronic apparatus;

FIG. 12 is an explanatory drawing illustrating an example of relation between cards and holders of different sizes;

FIG. 13 is an explanatory drawing illustrating an example of relation between a card and a holder of a different type;

FIG. 14A is a schematic cross-sectional explanatory drawing illustrating an example of a functional block embedded in the card;

FIG. 14E is a schematic cross-sectional explanatory drawing illustrating an example of another functional block embedded in the holder;

FIG. 14F is a schematic cross-sectional explanatory drawing illustrating an embodiment illustrated for explaining another example of a power supply system;

FIG. 15 is an explanatory drawing various examples of the shape of the holder;

FIG. 17 is an explanatory drawing illustrating an example of an arrangement position in the case where the card holding device and the card connecting device are mounted on a train.

DETAILED DESCRIPTION

Figure 5:
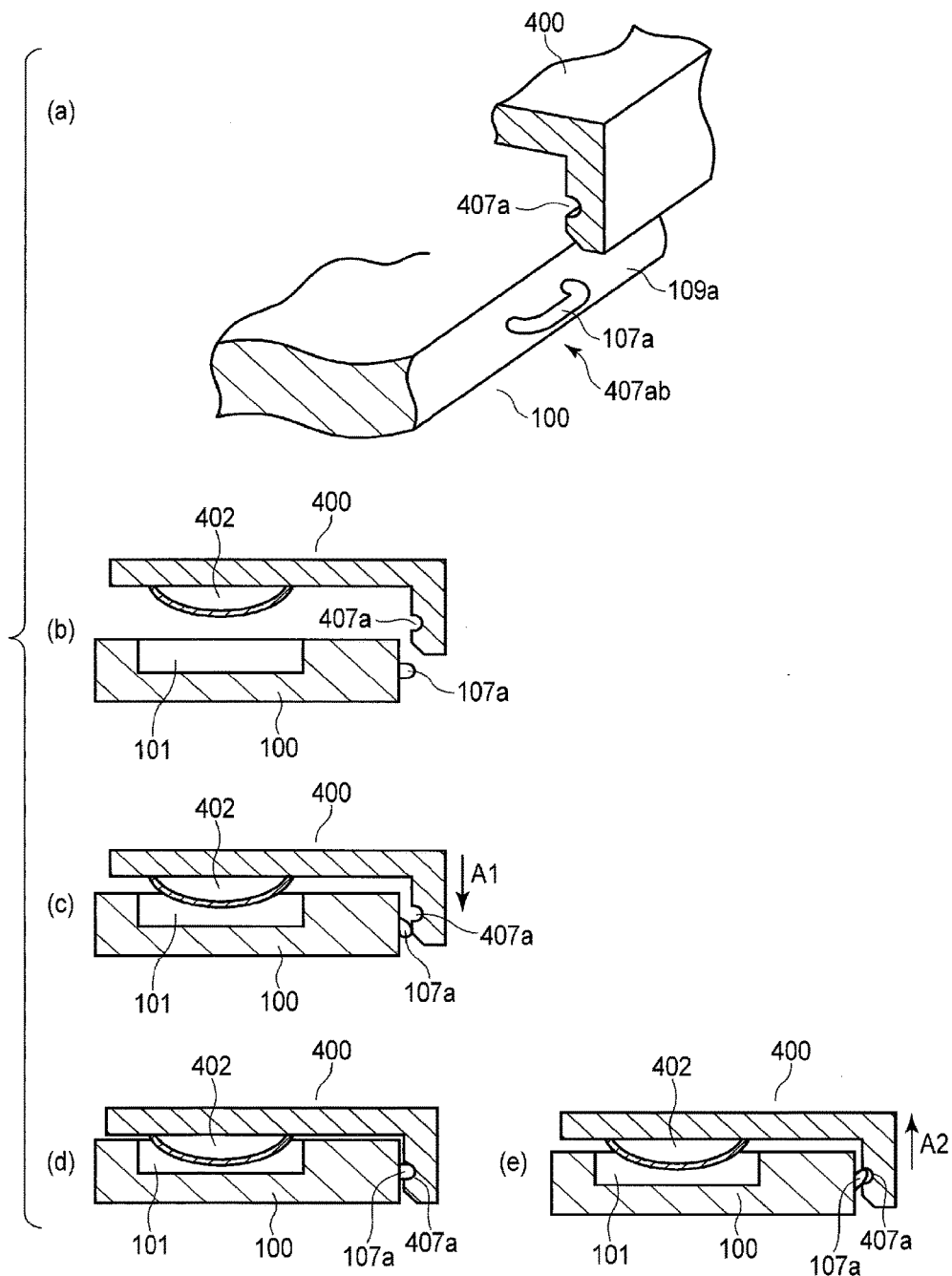
FIG. 5 is an explanatory drawing illustrating part of a lock mechanism for the holder and a lid in an embodiment for explaining it.

Various embodiments will be described hereinafter with reference to the accompanying drawings.

In general, according to one embodiment, an object of the present embodiment is to provide a card holding device enabling easy handling of a memory card, secures safety of a memory card, and enables improvement in reliability of the system using the memory card.

The present embodiment provides a card holding device comprising: a holder including a recessed portion formed of a resin material and including an opening, and including a contact exposed from part of a bottom surface of the recessed portion; a lid covering the holder from the recessed portion side, making a space in the recessed portion airtight in an engaged state in which the opening of the recessed portion is closed, and including an elastic member pushing down a contained object contained in the recessed portion; and a lock mechanism forming the engaged state in a first opposed position in which a surface of the lid and a surface of the holder are opposed, and forming a non-engaged state in a second opposed position.

An embodiment will be explained hereinafter with reference to drawings. FIG. 1 is an exploded perspective view illustrating a part of an embodiment of a card holding device or a card connecting device.

A holder 100 holding a card has an external appearance with a thin plate shape formed of synthetic resin or the like. The holder 100 is provided with a recessed portion 101 having an opening with a shape (for example, a pentagonal shape) in which one corner of a substantial longitudinal shape is cut away. The recessed portion 101 is capable of securing sealability, when a lid 400 is attached to cover the holder 100.

A plurality of contacts 103 are exposed on a surface (for example, a bottom surface) of the recessed portion 101. A terminal 105 projects from a side surface (for example, one side surface serving as a short side) indicating a thickness of the holder 100. The terminal 105 is electrically conductive to the contacts 103.

Each of side surfaces 109a and 109b serving as long sides of the holder 100 is provided with an elastic arm (that may also be referred to as "locking component", "locking member", or "hock component") projecting from the side surface. The arms 107a and 107b may be formed of resin or a metal wire.

A reference numeral 300 denotes a card formed of resin. A memory is embedded inside the card. The card 300 has a flat plate shape, and has a planar shape similar to the opening of the recessed portion 101, and can be loaded in the recessed portion 101 in parallel from the opening.

When the card 300 is loaded in the recessed portion 101, contacts of the card 300 are electrically connected with the corresponding contacts 103.

The lid 400 covers the holder 100 from the recessed portion 101 side, and can be united with the holder 100. In this state, the lid 400 is capable of sealing the recessed portion 101. In addition, the lid 400 includes an elastic member 402 pushing down a contained object (card 300) contained in the recessed portion 101, on an internal surface side thereof. The elastic member 402 may be formed of, for example, resin or metal. The elastic member 402 is illustrated with a dome shape, but the shape of the elastic member 402 is not limited thereto.

When the elastic member 402 is formed of metal, the elastic member 402 can function as an electric shield member for the card 300. The metal elastic member 402 can be used for antenna connection, according to the connection form thereof.

In addition, the structure includes a lock mechanism formed between the lid 400 and the holder 100, and changing them to a locked state or an unlocked state, according to a direction of external pressure applied to one of them. Specifically, locking portions 407a and 407b are formed on internal surfaces 409a and 409b of side walls of the lid 400, to correspond to the arms 107a and 107b of the holder 100. When the lid 400 is united with the holder 100, the arms 107a and 107b are engaged with the locking portions 407a and 407b, respectively.

As described above, the holder 100 has a structure in which the recessed portion 101 having an opening is formed of a resin material, and the contacts 103 are exposed from part of the bottom surface of the recessed portion.

In addition, as described later, the lid 400 covers the holder 100 from the recessed portion 101 side, causes the space of the recessed portion 101 to be an airtight state in a state where the opening of the recessed portion 101 is closed, and includes the elastic member 402 pushing down the contained object contained in the recessed portion 101.

FIG. 2 is a partial cross-sectional view illustrated for explaining an attachment state of the contacts 103 to the holder 100 according to an embodiment. Because a plurality of contacts 103 exist, FIG. 2 illustrates a contact 103a as a representative. FIG. 2 (a) illustrates a state in which the recessed portion 101 is empty, FIG. 2 (b) illustrates a state in which the card 300 is attached to the recessed portion 101, and FIG. 2 (c) illustrates a plan view of the contact 103a.

In the present embodiment, lead portions 3a1 and 3a2 of the contact 103a are buried in the thickness of the bottom portion 102 of the holder 100. Specifically, the contact 103a is a both end support structure, not a cantilever structure. An elastic portion 3a3 between the lead portions 3a1 and 3a2 projects from the bottom surface of the recessed portion 101. The elastic portion 3a3 is changed to a buckling state when it is pushed toward the bottom surface side of the recessed portion 101 (state of FIG. 2 (b)). This structure enables stable electrical connection between the contact 313 of the card 300 and the contact 103a of the holder 100, and stabilizes the card 300.

Because the contact 103a has a both end support structure as described above, the contact 103a has more durability than that of a cantilever structure. In addition, although a contact with a cantilever structure may not restore from a deformed state, a contact with a both end support structure has high restorability from the deformed state (state of FIG. 2 (b)) to the state of FIG. 2 (a).

A width W1 of the contact 103a may be larger than a width W2 of the lead portion in plan view.

FIG. 3 illustrates another example of the shape of the contact 103a. FIG. 2 (c) illustrates a structure in which the width W1 of the whole contact 103a is uniform. However, as illustrated in FIG. 3, the contact 103a may have a projection a' in a part thereof, and the part may have a width larger than that of the other portions. When the contact 103a with this structure is attached to the bottom portion 102 of the holder 100, the lead portions 3a1 and 3a2 and the elastic portion 3a3 between them also project from the surface of the bottom portion 102. When the contact 103a is pushed toward the bottom surface 102, the contact 103a is changed to a buckling state (see FIG. 2 (a)).

FIG. 4 is a perspective view illustrating a part of an example of a molding apparatus 600 for molding and manufacturing the holder used for an embodiment. The molding apparatus 600 includes an external frame 601 and an internal frame 602. The external frame 601 has a box shape including an upper opening, and has a bottom surface 601b including projecting spacers 603a, 603b, and 603c. The shape formed of internal walls of the external frame 601 corresponds to an external peripheral shape of the holder 100.

The internal frame 602 is disposed inside the external frame 601, with an interval from the internal walls of the external frame 601. The external peripheral shape of the internal frame 602 corresponds to the shape of the recessed portion of the holder. The internal frame 602 also has a box shape including an opening, and has a bottom surface disposed on the spacers 603a, 603b, and 603c.

The spacers 603a, 603b, and 603c are members to obtain the thickness of the bottom portion 102 of the holder 100, and secure a spacer space between the bottom surface of the external frame 601 and the rear surface of the bottom portion 102 of the internal frame 602. A bottom plate 602b of the internal frame 602 is provided with openings to expose the contacts 103a, 103b, . . . to the internal surface of the bottom plate 602b of the internal frame 602.

With this structure, the contacts 103a, 103b, . . . are exposed to the inside of the internal frame 602, and the terminals 105a, and 105b thereof are guided to the outside of the external frame 602 through the spacer space via through holes formed in a side wall 601c of the external frame 600.

The space generated between the external frame 601 and the internal frame 602 is filled with resin to form the holder or a member such as ceramics according to the specifications, and the filling material is cured. Thereafter, the internal frame 602 is removed, to form the recessed portion of the holder. Next, the side wall 601c of the external frame 601c is detached from the main body. The side wall 601c is drawn in a direction in which the terminals 105a and 105b extend, to be removed. For this reason, the terminals 105a and 105b are fixed by the cured resin, and left.

Thereafter, the cured holder is taken out of the external frame 601. Although holes due to existence of the spacers 603a, 603b, and 603c are left in the bottom portion of the holder, the holes are filled with resin separately.

FIG. 5 is a diagram illustrating part of a lock mechanism 407ab for explaining the lock mechanism 407ab that is formed between the lid 400 and the holder 100, and changes them to a locked state and an unlocked state according to a direction of external pressure applied to one of them.

As illustrated in FIG. 5 (a), the side surface 109a serving as a long side of the holder 100 is provided with the elastic arm 107a projecting from the side surface.

The locking portion 407a is formed on the internal surface side of the side wall of the lid 400, to correspond to the arm 107a of the holder 100. The locking portion 407a serves as a groove-shaped locking portion 407a into which the arm 107a can be fixed. FIG. 5 (b) to (e) illustrate an on-going status when the lid 400 is united with the holder 100, and an on-going status when they are detached from each other.

As illustrated in FIG. 5 (b) to (c), when the lid 400 is put on the holder 100, and pushed in a direction of an arrow A1, the arm 107a is displaced. Thereafter, when the locking portion 407a reaches the position of the arm 107a, the arm 107a returns from the displaced state, and the arm 107a enters the locking portion 407a, to make the locked state (the state of FIG. 5 (d)).

When the lid 400 is pulled in a direction of an arrow A2 from the state of FIG. 5 (d), the arm 107a locked in the locking portion 407a is displaced. When the lid 400 is further pulled in the direction of the arrow A2, the arm 107a is separated from the locking portion 407a. In this manner, the unlocked state is obtained.

The locking portions 407a and 407b may be formed on the side surfaces of the holder 100, and the arms 107a and 107b may be provided on the internal surfaces of the corresponding side walls of the lid 400.

As described above, the lock mechanism forms an engaged state (FIG. 5 (d)) in a first opposed position between the surfaces (side surfaces 107a and 107b) of the lid 400 and surfaces (side surfaces 109a and 109b) of the holder 100, and forms a non-engaged state (FIGS. 5 (a), (c), and (e)) in a second opposed position.

FIG. 6 is a perspective view illustrating the lid 400 used for an embodiment from the rear side. The lid 400 includes the elastic member 402 having, for example, a dome shape, to push down the card 300, inside. In addition, the internal surface of the side wall of the lid 400 is provided with the locking portion 407a to form the lock mechanism 407ab described above.

Although the elastic member 402 is explained with a dome shape, the elastic member 402 is not limited to a dome shape, as long as the elastic member 402 has a structure to stably and elastically pushing down the card 300. The elastic member 402 also may have a structure capable of buckling, like the contacts 103b described above.

Various shapes such as a circular shape, an oval shape, and a rectangular shape may be selected as the circumferential shape of the elastic member 402. For example, the external shape of the elastic member 402 may agree with the external shape of the opening of the recessed portion 101 of the holder 100.

FIG. 7 is a perspective view illustrating a modification of the holder 100. The holder 100 illustrated in FIG. 7 (a) is capable of further improving air-tightness of the space of the recessed portion 101 when united with the lid 400. To achieve it, the holder 100 is provided with a rectangular waterproof band 202 on a flat surface around the opening of the recessed portion 101.

In addition, the holder 100 illustrated in FIG. 7 (b) is provided with a waterproof band 204 along circumferential side walls inside the recessed portion 101. When the waterproof band 204 exists, the shape of the elastic member 402 of the lid 400 preferably agrees with the opening of the recessed portion 101. This is because the elastic member 402 with such a shape is in close contact with the waterproof band 204, to maintain air-tightness of the space in the recessed portion 101, when the holder 100 is united with the lid 400.

As described above, the present card holding device 1000 includes the card retaining portion with high air-tightness, and has remarkably expanded field of use. For example, the present card holding device 1000 can be attached to tools used underwater, such as life preservers and rubber boats, or electronic apparatuses. In addition, the present card holding device 1000 can be used for devices and meters used in places where it rains.

Figure 8:
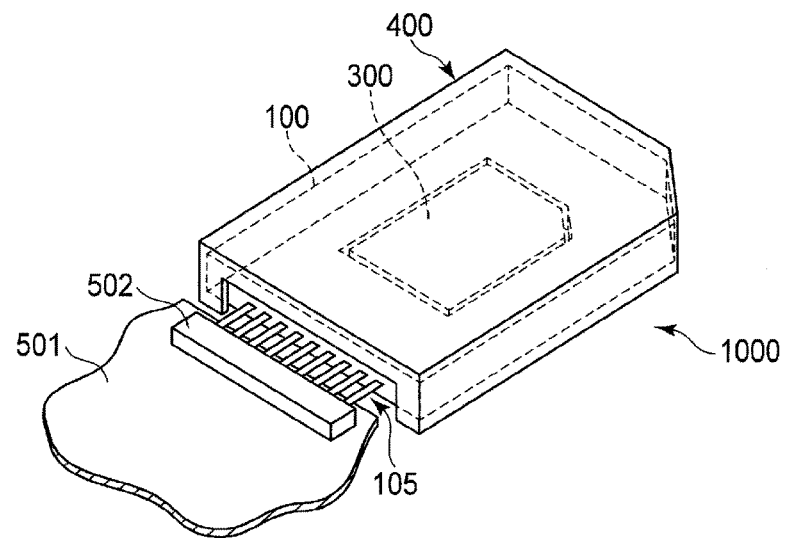
FIG. 8 is a perspective view illustrating an example of an embodiment in which the card holding device and a card connecting device are connected with a flexible board.

FIG. 8 is a perspective view illustrating an example of an embodiment in which the card holding device 1000 is connected with a flexible board 501. A connector 502 is attached onto the flexible board 501. One side of a terminal portion of the connector 502 is connected with a predetermined wire of the flexible board 501. The terminals 105 of the card holding device 1000 can be inserted into the other side of the terminal portion of the connector 502. The other portions of the card holding device 1000 have the same structure as that of the embodiment described above, and explanation thereof is omitted, with the same reference numerals as those of the embodiment described above attached thereto.

Figure 9:
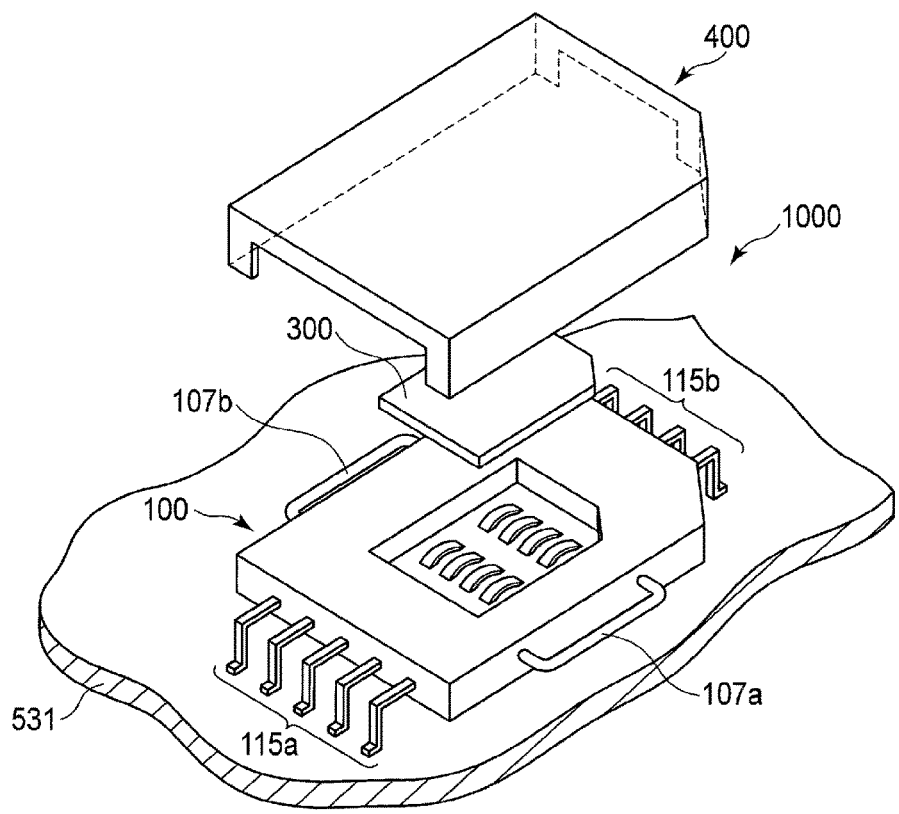
FIG. 9 is a perspective view illustrating an example of an embodiment in which the card holding device and the card connecting device are connected with a printed wiring board.

FIG. 9 is a perspective view illustrating an example of an embodiment in which the card holding device 1000 is connected with a printed wiring board 531. In this case, connection terminals 115a and 115b of the holder 100 of the card holding device 1000 are bent to have, for example, an L shape, and distal ends of the terminals are inserted into connection holes of the printed wiring board 531, brought into contact with a predetermined wiring portion, and soldered. The other portions of the card holding device 1000 have the same structure as that of the embodiment described above, and explanation thereof is omitted, with the same reference numerals as those of the embodiment described above attached thereto.

As described above, the connection terminals 105, 115a, and 115b of the holder 100 may be changed according to the place where the card holding device 1000 is used.

Figure 10:
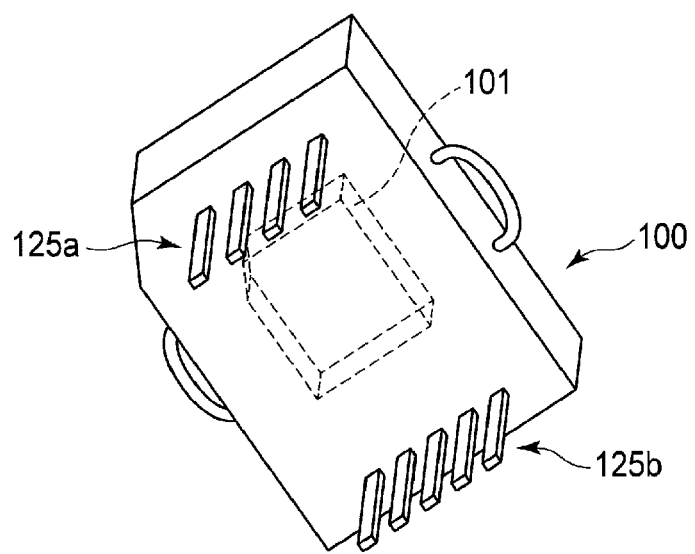
FIG. 10 is a perspective view illustrating another example of a terminal provided on the holder.

FIG. 10 is a perspective view illustrating another example of the terminals provided in the holder 100. Connection terminals 125a and 125b are provided to perpendicularly project from the bottom surface of the holder 100. The other portions of the card holding device 1000 have the same structure as that of the embodiment described above, and explanation thereof is omitted, with the same reference numerals as those of the embodiment described above attached thereto.

FIG. 11A is a diagram illustrating an example of an embodiment in which the card holding device 1000 is mounted to an electronic apparatus 800A. In this case, the holder 100 including the terminals 125a and 125b illustrated in FIG. 10 is adopted.

The electronic apparatus 800A includes a recessed portion 801 agreeing with the plan shape of the card holding device 1000, and in which the whole card holding device 1000 can be disposed in a plane manner. The recessed portion 801 is formed in a flat surface of the electronic apparatus 800A. The electronic apparatus 800A also includes connectors 805a and 805b into which the terminals 125a and 125b can be inserted, in a bottom surface of the recessed portion 801. In addition, a lid 811 is prepared. The lid 811 is capable of covering the opening of the recessed portion 801, when the card holding device 1000 is disposed in the recessed portion 801. Projections 811f to 811i are formed on side surfaces of the lid 811, to be engaged with locking portions 801f to 801i (801f and 801g are not illustrated in the drawing) provided on side walls of the recessed portion 801. The locking mechanism may have the same structure as that of the lock mechanism formed of the holder 100 and the lid 400 described above.

The lid 811 includes recessed portions 811a and 811b at edges thereof. Jigs are engaged with the recessed portions 811a and 811b when the lid 811 is detached from the recessed portion 801. The lid 811 is detached from the recessed portion 801, by user's pulling the jigs.

The external surface of the lid 811 may be provided with a seal on which a mark, a number, and/or picture is printed. The lid 811 with this structure improves the external appearance of the electronic apparatus.

FIG. 11B is a diagram illustrating another example of the embodiment in which the card holding device 1000 is mounted to an electronic apparatus 800B. The electronic apparatus 800B is, for example, a smartphone or a tablet terminal, and a rear surface thereof is illustrated. Part of the rear surface is provided with a recessed portion as illustrated in FIG. 11A, and a lid P11 covers the opening of the recessed portion.

The lid P11 is capable of forming a flat surface together with the rear surface of the electronic apparatus 800B. The attachment structure of the card holding device 1000 in such a form enables attachment of the card holding device 1000 without deteriorating the external appearance or the design of the electronic apparatus 800B.

FIG. 11C is a diagram illustrating another example of the embodiment in which the card holding device 1000 is mounted to an electronic apparatus 800C. The electronic apparatus 800C is, for example, a portable personal computer. Generally, a personal computer is equipped with keys, and a seal is put on a flat portion of the upper surface of the personal computer. For this reason, an attachment form of the card holding device 1000 may be, for example, a form in which a recessed portion explained in FIG. 11A is provided under a seal, and the lid P12 including the seal covers the opening of the recessed portion. Specifically, the seal and the lid may be united. Another embodiment may have a structure in which a recessed portion as explained in FIG. 11A is provided under the keys, and false keys serving as the lid P13 cover the opening of the recessed portion. Specifically, the false keys and the lid may be united. The holder 100 may be disposed under the false keys.

FIG. 11D is a diagram illustrating another example of the embodiment in which the card holding device 1000 is mounted to an electronic apparatus 800D. The embodiment illustrates an example in which the card holding device 1000 is inserted to be slid in an inserting portion P15 formed in a side surface of the electronic apparatus 800D. As another example, the inserting portion P15 may be provided with a tray to guide the card holding device 1000.

Figure 11E:
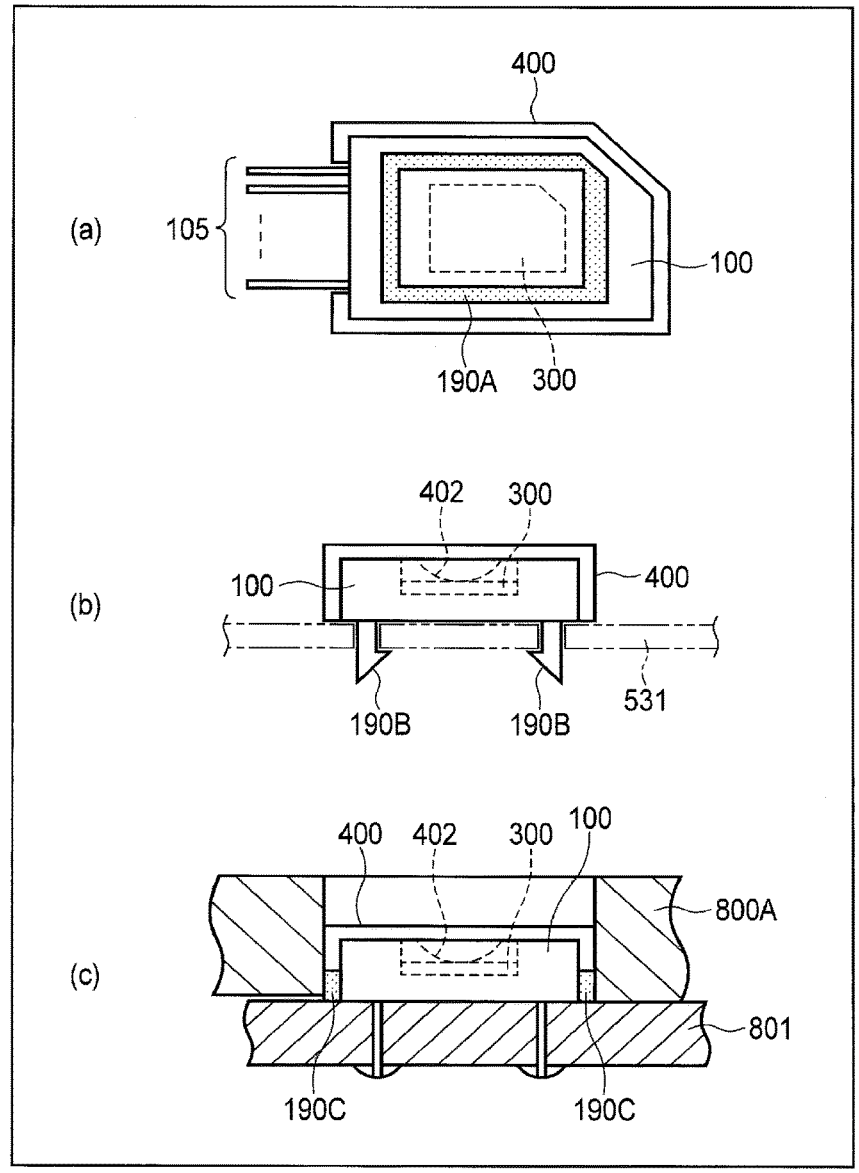
FIG. 11E is a diagram illustrating a structure example for stabilizing fixation of the holder when the card holding device and the card connecting device are mounted on an electronic apparatus or a substrate.

FIG. 11E is a diagram illustrating a fixing mechanism provided on the holder 100. In the present device, the lid 400 is put on the holder 100, and the lid 400 is detached from the holder 100. For this reason, force (load) may be applied to the holder 100 from the outside. When fixation of the holder 100 is unstable and weak, connection failure and/or connection breakage easily occurs between the terminal and the wire. Accordingly, it is necessary that the holder 100 is securely fixed to the fixing position. For this reason, as illustrated in FIG. 11E (a), an adhesive 190A is preferably applied onto a bottom surface of the holder 100, to fix the holder 100 to the board or the flexible board.

As another example, as illustrated in FIG. 11E (b), hooks or bosses 190B may be provided on the bottom surface or side surfaces of the holder 100, to reinforce fixation to the board or the attachment portion. Both the hooks or bosses 190 and the adhesive may be used. As another example, as illustrated in FIG. 11E (c), the holder 100 may be fixed with an adhesive or solder to side wall surfaces and the bottom surface of the recessed portion 801 of the electronic apparatus 800A.

When the terminals 105 are connected with the board, a solder pad and/or a solder reinforcing pad may be used. As another example, when the holder 100 is fixed, various embodiments are possible for a method for reinforcing the fixation.

FIG. 12 is an explanatory drawing illustrating an example of relation between cards and holders of different sizes. The explanation of the embodiments described above does not refer to the sizes of the recessed portion and the opening thereof of the holder 100. However, various sizes of the recessed portion and the opening thereof of the holder 100 may be prepared in accordance with the sizes (L21, L22, and L24) of cards 300A, 300B, and 300C, as illustrated in FIG. 12 (*a*) to (*c*). However, in this case, the external size (L1) of the holders 100A to 100C is preferably fixed, to maintain easiness of handling of the card holding device 1000 uniform.

Recently, memory cards are miniaturized more and more. However, in this case, to maintain compatibility, the corresponding positional relation between the contacts 103*a* and 103*b* and contacts 313*a* and 313*b* of the card to be connected is fixed even when the sizes of the memory cards are different.

FIG. 13 is an explanatory drawing illustrating an example of relation between the holder and a card of a type different from those of the embodiments described above. As illustrated in FIG. 13, cards include a card 300E in which contacts 323 are arranged along an edge of the card main body. The holder 100 compatible with the card 300E of this type includes a recessed portion 101 having an opening corresponding to the external appearance shape of the card 300E. Contacts 123 are exposed from an internal surface of the recessed portion 101, to face the portion where the contacts 323 are positioned when the card 300E is attached to the recessed portion 101.

The lid explained above is also put on the holder 100, to maintain air-tightness of the recessed portion. Each of the contacts 123 has a function similar to that of the embodiments described above, and has a both end support structure. The card 300E contained in the recessed portion 101 is pushed down by the elastic member provided on the lid, and the position is stabilized.

FIG. 14A is a schematic cross-sectional explanatory drawing illustrating an example of a functional block embedded in a card. The card 300B includes an interface 311 to input and output data, and a memory 312. Mutual communication with the exterior is performed through the terminal 105*a*, to write data to the memory 312 and read data from the memory 312. Another terminal is used as a power feed terminal. In the present device, the elastic member 402 may have conductivity, and may be used as an electrical shield member for the card 300B. The other portions have the same structure as that of the embodiment described above, and explanation thereof is omitted, with the same reference numerals as those of the embodiments described above attached thereto.

Figure 14B:
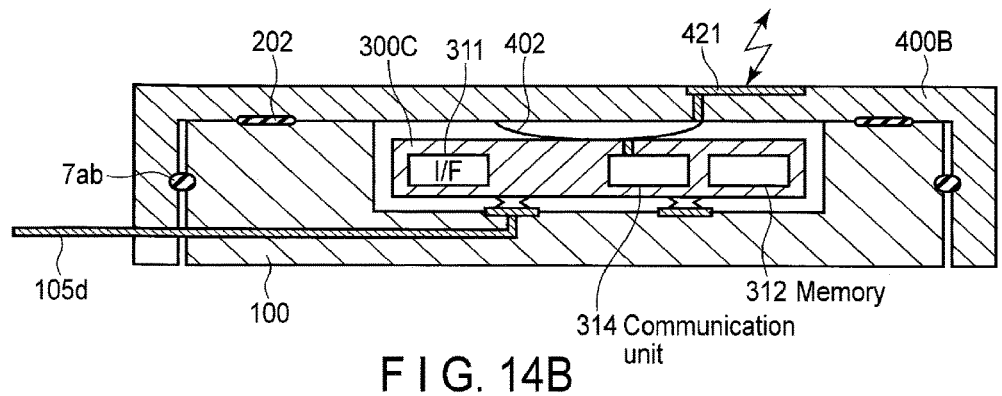
FIG. 14B is a schematic cross-sectional explanatory drawing illustrating an example of another functional block embedded in the card.

FIG. 14B is a schematic cross-sectional explanatory drawing illustrating an example of another functional block embedded in a card. A card 300C includes an interface 311 to input and output data, a memory 312, and a communication unit 314. The card 300C also includes a terminal portion through which the communication unit 314 is connected with the elastic member 402. The elastic member 402 is formed of a conductive material, and electrically connected with an antenna 421 provided on a lid 400B. In the device, a terminal 105*d* is used as a power feed terminal. In addition to the terminal 105*d*, a terminal to exchange data with an apparatus may be provided. The card holding device is enabled to have a function of collecting data from peripheral sensors through the communication function.

The other portions have the same structure as that of the embodiment described above, and explanation thereof is omitted, with the same reference numerals as those of the embodiments described above attached thereto.

Figure 14C:
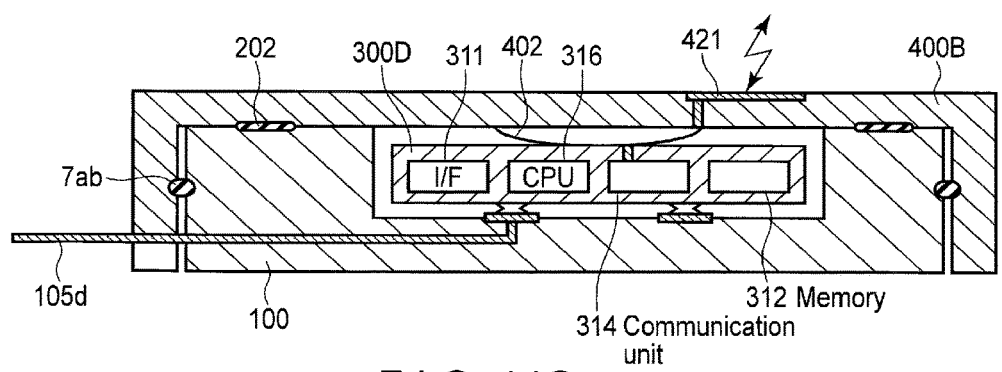
FIG. 14C is a schematic cross-sectional explanatory drawing illustrating an example of another functional block embedded in the card.

FIG. 14C is a schematic cross-sectional explanatory drawing illustrating an example of another functional block embedded in a card. This embodiment is different from the embodiment of FIG. 14B, in that a card 300D further includes a central processing unit (CPU) 316. The other portions are the same as those of the embodiment of FIG. 14B, and explanation thereof is omitted.

The card holding device is enabled to have a function of collecting data from peripheral sensors through the communication function. In addition, because the card holding device includes the CPU 316, the CPU 316 is capable of analyzing the collected data, and notifying a predetermined apparatus of an analysis result through the communication function.

Figure 14D:
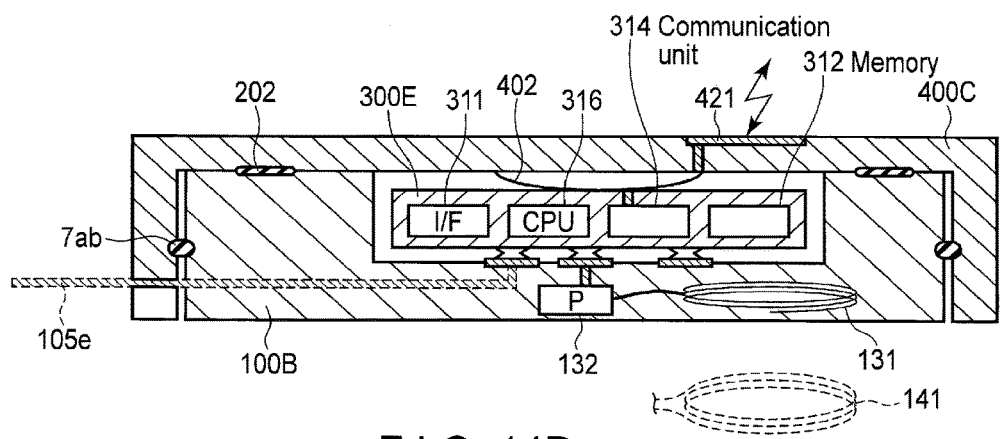
FIG. 14D is a schematic cross-sectional explanatory drawing illustrating an example of another functional block embedded in the holder.

FIG. 14D is a schematic cross-sectional explanatory drawing illustrating an example of another functional block embedded in a holder. In the present embodiment, a thick portion at the bottom of a holder 100B is used. The thick portion is provided with a power receiving portion 131 formed of a coil. The power receiving portion 131 is capable of receiving power supply from a power feed portion 141 with an alternating current electromagnetic field. A current induced by the power receiving portion 131 is supplied to a power storage unit 132. The power storage unit B is capable of converting a current into voltage and storing power. The output power of the power storage unit B is used in an electronic circuit of a card 300E. The power storage unit B includes an output circuit, and supplies its output power to the electronic circuit in the card 300E only when the stored voltage becomes equal to or higher than a fixed value.

In the present embodiment, a terminal to supply power to the card 300E and a data input/output terminal 105*e* may be provided as auxiliary terminals, or may be omitted.

As described above, the holder 100B has a structure in which the coil 131 to feed power is embedded inside. The same portions as those of the other embodiments are denoted by the same reference numerals as those in the other embodiments, and explanation thereof is omitted.

FIG. 14E is a schematic cross-sectional explanatory drawing illustrating an example of another functional block embedded in a holder. The present embodiment also includes the power receiving portion 131 and the power storage unit B, like the embodiment of FIG. 14D. In addition, the present embodiment has a structure in which a transmission antenna 133 is embedded in a holder 1000. Accordingly, the structure requires no antenna 421 provided in the lid 400C, unlike the embodiment illustrated in FIG. 14D. In the present embodiment, a terminal to supply power to a card 300F and a data input/output terminal 105*f* may be provided as auxiliary terminals, or may be omitted.

As described above, the coil 133 for near field communication is embedded inside the holder 100C. The same portions as those of the other embodiments are denoted by the same reference numerals as those in the other embodiments, and explanation thereof is omitted.

As described above, the coil 133 for near field communication is embedded inside the holder 100C.

FIG. 14F is a schematic cross-sectional explanatory drawing illustrating another example of the power supply system. In the present embodiment, a solar cell board 430 is provided on, for example, an external surface of the lid 400. When the lid 400 is united with a holder 100D, the solar cell board 430 is connected with the power storage unit B provided in the holder through a contact 431. The power storage unit B is capable of converting an output current from the solar cell board 430 into voltage, and storing power. The output power of the power storage unit B is used in an electronic circuit of a card 300G. The same portions as those of the other embodiments are denoted by the same reference numerals as those in the other embodiments, and explanation thereof is omitted.

FIG. 15 is an explanatory drawing illustrating various examples of the shape of the holder. As described above, the present embodiment has high degree of freedom, when it has a planar design. For this reason, as illustrated in FIG. 15 (a) to (e), the planar shape of the card holding device 1000 may be various shapes. Accordingly, the card holding device 1000 may have different external shapes according to the attachment place to which it is attached, the device to be used, or the manufacturer of the card holding device 1000. For example, when the card holding devices 1000 have different shapes according to the place in which the card holding devices 1000 are used (such as a window, a roof, a driver's seat, and a rear surface), the user is prevented from erroneously attaching a card holding device having a different function. Specifically, this structure achieves good usability of the card holding device 1000.

Figure 16:
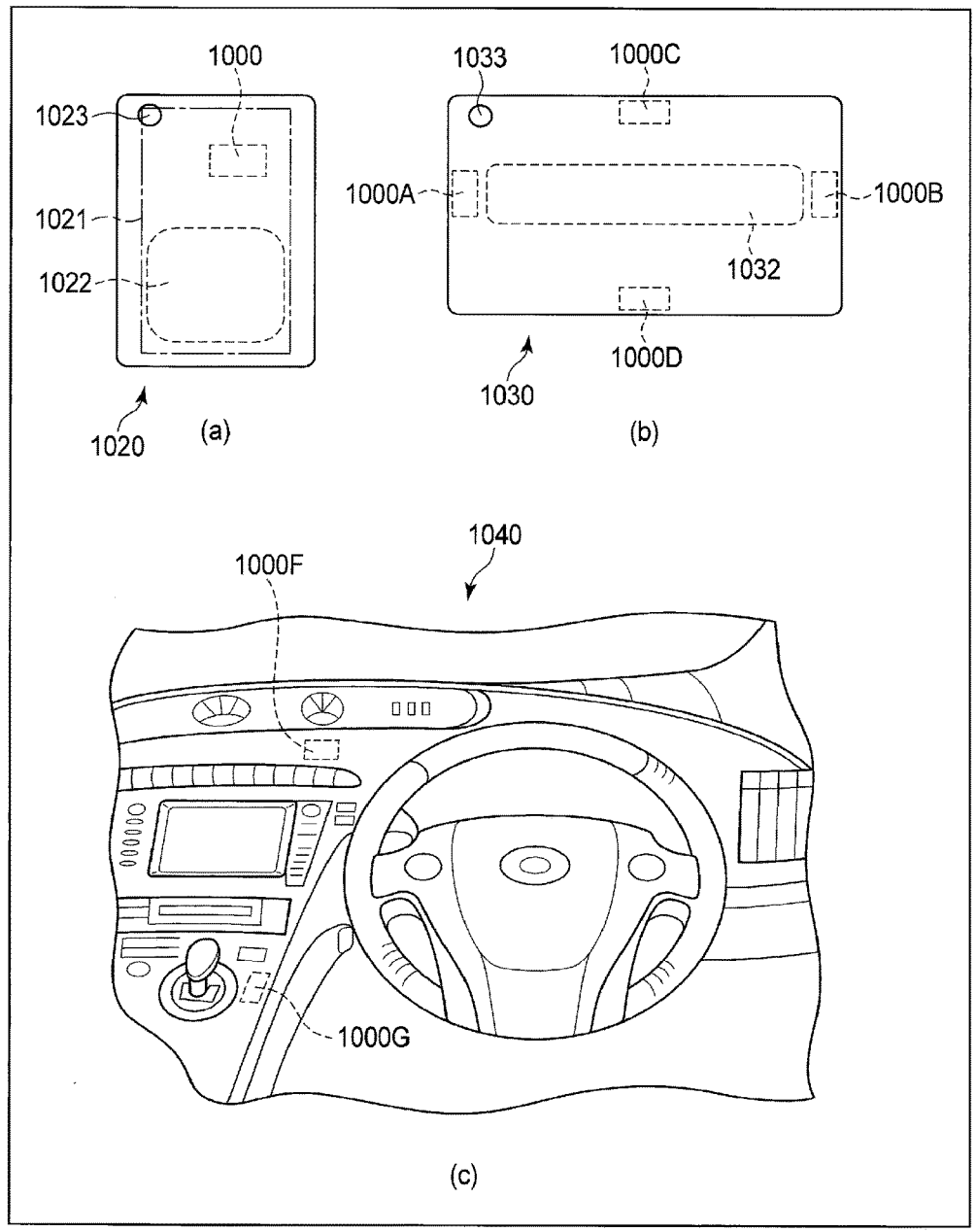
FIG. 16 is an explanatory drawing illustrating an example of arrangement positions in the cases where the card holding device and the card connecting device are mounted on a smartphone, a tablet terminal, and a driver's seat.

FIGS. 16 (a), (b), and (c) are explanatory drawings illustrating examples of arrangement positions in the cases where the card holding device is mounted to a smartphone 1020, a tablet terminal 1030, and a driver's seat 1040 of a vehicle, respectively.

The smartphone 1020 in FIG. 16 (a) has a substantially rectangular shape in a plan view. The smartphone 1020 includes a backlight 1020, and a battery 1022 can be attached to the smartphone 1020. Generally, a camera lens 1023 is exposed in one of four corners of the smartphone 1020. The battery 1022 influences the center of gravity of the smartphone 1020. When the lens 1023 is provided at one short side, the battery 1022 is provided at the other short side. In the smartphone 1023 as described above, the card holding device 1000 can be disposed between the lens 1023 and the battery 1022.

The card in the card holding device of the smartphone is capable of storing, for example, use history data of the smartphone, positional data in use of the smartphone, communication history data, and ambience change data such as ambient temperature and humidity.

The tablet terminal 1030 in FIG. 16 (b) has a substantially rectangular shape in plan view, and includes a backlight (not illustrated). A battery 1032 can be attached to the tablet terminal 1030. Generally, a camera lens 1033 is exposed in one of four corners of the tablet terminal 1030.

Suppose that the battery 1032 is disposed in the center of the tablet terminal 1030. In such a case, the card holding device is disposed in, for example, one of illustrated positions (position 1000A or 1000B in the center of the short side, or position 1000C or 1000D in the center of the long side).

The card in the card holding device of the tablet terminal is also capable of storing data similar to those stored in the card of the smartphone described above.

The card holding device may be provided in a vehicle driver's seat in FIG. 16 (c). In this case, the card holding device is provided in a position 1000F in part of a dashboard of the driver's seat, or a position 1000G close to the gear handle on the side of the driver's seat. Specifically, the place where the holder 100 is disposed is close to an in-vehicle electronic apparatus.

The card in the card holding device is capable of storing, for example, a vehicle driving history, an engine operation history, and data of change (such as pressure, speed, and temperature) of various parts of the vehicle.

FIG. 17 is an explanatory drawing illustrating an example of arrangement positions in the case where the card holding device is mounted to a train 1050. For example, the card holding device may be disposed in a position 1000J in part of the driver's seat, and/or a position 1000K in part of a power storage controller of the train.

The card in the card holding device is capable of storing, for example, a driving history of the train, a control operation history thereof, and operation history data of the power storage device.

The arrangement positions of the card holding device described above are examples, and the card holding device may be disposed in any position.

The embodiments of the present invention described above are presented as examples, and are not aimed at limiting the scope of the invention. These novel embodiments may be carried out in other various forms, and various omissions, replacement, and changes may be made within a range not departing from the gist of the invention. These embodiments and modifications thereof are included in the scope and the gist of the invention, and included in the inventions recited in the claims and a range equivalent to them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A card holding device comprising:
    a holder including a recessed portion formed of a resin material or ceramics and including an opening, and including a contact exposed from part of a bottom surface of the recessed portion;
    a lid covering the holder from the recessed portion side, making a space in the recessed portion airtight in an engaged state in which the opening of the recessed portion is closed, and including an elastic member pushing down a contained object contained in the recessed portion; and
    a lock mechanism forming the engaged state in a first opposed position in which a surface of the lid and a surface of the holder are opposed, and forming a non-engaged state in a second opposed position.

2. The card holding device according to claim 1, wherein a dustproof and waterproof member is provided between the lid and the holder.

3. The card holding device according to claim 1, wherein the contact of the holder includes an elastic portion projecting from the bottom surface of the recessed portion, and includes lead portions disposed at both ends of the elastic portion and embedded in the bottom surface of the recessed portion.

4. The card holding device according to claim 1, wherein the elastic member provided in the lid is formed of a shield material.

5. The card holding device according to claim 1, wherein the contained object is a memory card including a resin member containing at least a memory, and including a connection terminal corresponding to the contact, and the resin member has a thin flat plate shape and has flat front and rear surfaces.

6. The card holding device according to claim 1, wherein the contact of the holder is electrically drawn to outside of the holder through inside of the resin forming the holder and having a thickness.

7. The card holding device according to claim 1, wherein the holder or the lid includes an antenna.

8. The card holding device according to claim 1, wherein the holder includes a near field communication coil embedded in the holder.

9. The card holding device according to claim 1, wherein the holder includes a power feed coil using an electromagnetic field and embedded in the holder.

10. The card holding device according to claim 1, wherein the holder includes a power storage unit inside the holder.

11. The card holding device according to claim 1, further comprising:
a connection terminal electrically connected with the contact, and projecting from the holder,
wherein the connection terminal is connected with a terminal portion of a connector fixed to a flexible board.

12. The card holding device according to claim 1, further comprising:
a connection terminal electrically connected with the contact, and projecting from the holder,
wherein the connection terminal is bent and includes a distal end inserted in a connection hole of a printed wiring board.

13. The card holding device according to claim 1, further comprising:
a connection terminal electrically connected with the contact, and projecting from the holder,
wherein the connection terminal is provided to perpendicularly project from a bottom surface of the holder.

14. The card holding device according to claim 1, wherein the card holding device is attached, in a planar manner, to a recessed portion formed in a flat surface of a housing of an electronic apparatus.

15. The card holding device according to claim 14, wherein the electronic apparatus is any one of a smartphone, a tablet computer, a personal computer.

16. The card holding device according to claim 1, wherein the holder is disposed under a false key provided on an electronic apparatus.

17. The card holding device according to claim 1, wherein the holder is disposed close to an in-vehicle electronic apparatus.

18. The card holding device according to claim 1, wherein the holder is disposed in part of a driver's seat of a train.

19. The card holding device according to claim 1, wherein the contact of the holder has elasticity and is capable of buckling and being deformed.

20. The card holding device according to claim 1, wherein the contained object has a card-like shape, and includes a memory, an interface, and an central processing unit or a communication unit.

* * * * *